United States Patent [19]

Donenfeld

[11] 4,013,405

[45] Mar. 22, 1977

[54] AQUEOUS PRINTING PASTES FOR PRODUCING TRANSFER PRINTING PAPERS BY ROTARY SCREEN PRINTING

[75] Inventor: Henry Donenfeld, Brighton, Australia

[73] Assignee: Printon Australasia Pty. Limited, Victoria, Australia

[22] Filed: Mar. 12, 1974

[21] Appl. No.: 450,411

[30] Foreign Application Priority Data

Mar. 12, 1973 Australia .......................... 2541/73
Apr. 2, 1973 Australia .......................... 2833/73

[52] U.S. Cl. .................................. 8/2.5 A; 8/62; 8/173
[51] Int. Cl.² .................... D06P 0/00; B41M 3/12
[58] Field of Search ........................... 8/2.5, 62

[56] References Cited

UNITED STATES PATENTS

| | | | |
|---|---|---|---|
| 2,245,123 | 6/1941 | Belloc | 8/62 X |
| 2,517,751 | 8/1950 | Woodruff | 8/173 |
| 2,710,263 | 10/1958 | Clark et al. | 8/2.5 |
| 3,164,436 | 1/1965 | Altermatt | 8/176 X |
| 3,706,525 | 12/1972 | Blackwell | 8/21 C |

FOREIGN PATENTS OR APPLICATIONS

| | | | |
|---|---|---|---|
| 268,322 | 7/1962 | Australia | 8/2.5 |
| 1,223,330 | 2/1960 | France | 8/2.5 |
| 1,169,957 | 11/1969 | United Kingdom | 8/2.5 |

OTHER PUBLICATIONS

Fox et al., J.S.D.C., Dec. 1969, pp. 614–616.
Bent et al., Jour. Soc. Dyers & Col., 1969, pp. 606–613.
Ellis Printing Inks, pp. 311–320, pub. 1940 by Reinhold Pub. N.Y.C.
Chem. Abstracts, vol. 63, Keaton et al., Jour. Soc. Dyers & Col., June (1964), pp. 312–322.

*Primary Examiner*—Donald Levy
*Attorney, Agent, or Firm*—Lerner, David, Littenberg & Samuel

[57] ABSTRACT

A highly improved printing paste, including a sublimable dye, a thickener and water, is disclosed, which includes an additive capable of increasing the effective amount of dye which is transferred to printing papers, thus greatly improving and simplifying the entire printing process. The additives disclosed include certain aliphatic alcohols in addition to certain cresols, products of the saponification of a fatty oil combined with a) a compound selected from the group consisting of ortho, meta, and para hydroxytoluene and ortho hydroxy diphenyl, and b) propylene glycol, phenyl methylacetate, dibutyl glycerol ethers, eucalyptus oil, dibutyl phthalate, and sodium salts of an aromatic sulphonic acid. Methods for preparing transfer printing papers utilizing these printing pastes are also disclosed, as well as the improved transfer papers prepared therefrom. These transfer printing papers may thus be prepared with conventional screen printing apparatus by employing these improved printing pastes. Furthermore, methods for printing textile fabrics from these printed papers are also disclosed, as well as the improved textile fabrics prepared therefrom.

9 Claims, No Drawings

AQUEOUS PRINTING PASTES FOR PRODUCING TRANSFER PRINTING PAPERS BY ROTARY SCREEN PRINTING

This invention relates to the art of printing on woven or knitted textile fabrics by transfer of dye from a printed substrate, usually paper, which has been treated with a printing paste comprising a dispersion of a sublimable dye. The printed paper substrate is brought into contact with the fabric and heated to a temperature at which the dye sublimes and is transferred to the fabric in a pattern corresponding to that with which the form was printed. Complex patterns can be printed by means of this technique and the process is used on a large scale throughout the world.

This invention specifically relates to improved printing pastes for use in the preparation of such transfer papers, as well as the subsequent use of such prepared transfer papers in the printing of improved textile fabrics. Furthermore, this invention relates to the improved printing papers produced from these printing pastes, as well as the improved textile fabrics prepared from these printing papers.

Transfer printing papers have been produced on traditional paper printing machinery and then sold to the textile printers and heat-transfer converters for use on textile heat transfer calenders. From the textile printer's point of view, this has several important disadvantages.

Paper printing machinery traditionally employs the gravure process which requires expensive etched metal rollers, or the flexographic process which uses etched rubber rollers. The latter is inferior due to pressure variation across the roller which results in colour variations between the center and edges. The gravure process procedures superior paper but can only be operated economically in long runs of the order of 20,000 to 50,000 meters. This is due to the initial high cost of the rollers, and other factors. For example the design change-over time is 4 to 12 hours compared with about 35 minutes for a corresponding change-over on a rotary screen printing machine. Furthermore, the capital cost of traditional paper printing machinery is extremely high compared with rotary screen printing plant. A four-colour gravure machine for printing 62 inches wide paper can cost in excess of one million dollars (Australian) compared with about $125,000 (Australian) for a rotary textile machine of similar capacity.

As no single customer is likely to need the entire run, the specification of gravure printed paper must be designed as a compromise between the differing requirements of several customers among whom the run is to be divided. Consequently none of those customers will receive a paper having optimum properties for his own requirements particularly as regards fiber and resultant fastness properties. Furthermore none of these customers can demand an exclusive design, except at prohibitive cost.

Accordingly, there as been an urgent need for a process that could produce short-run printing papers at economic cost, but prior to the present invention this has not been possible.

The present invention permits textile printing papers to be manufactured economically in short runs, say of the order of 3,000 meters. It also enables textile printers and heat transfer converters to avoid their previous dependence upon traditional paper printing machinery for production of textile printing papers. By using the printing pastes of the present invention, textile printers are now able to manufacture their own papers on their existing conventional rotary screen textile printing equipment, with very modest modifications to that equipment.

Being water-based, the printing pastes of the present invention present no problems to textile printers.

By using the rotary screen printing system, the high cost of metal-roller engraving is avoided. The textile printer can produce his own papers to his own specification as regards the chosen fibres and in his own exclusive design on his own machinery at reasonable cost even on short runs. It will be appreciated that the present invention thereby heralds a revolutionary advance in the textile printing industry.

As an additional benefit, the compositions of the present invention provide greatly improved economy in dyestuff usage, and it has been found that a satisfactory product can be made even with relatively low grade paper, without any need for special paper coatings.

In printing textiles from paper the principal parameters affecting the economics of the transfer printing process are (a) temperature, (b) time, and (c) the proportion of dye that actually transfers under the imposed conditions, which we shall call the colour yield. Prior to the present invention, a limiting factor in the economics of the process has been the relatively inefficient utilisation of dye. It has been the subject of intensive investigation to discover means of maximising the colour yield. Even increasing (a) and (b) in the prior art processes does not achieve the improvement in colour yield that can now be attained by the present invention.

According to the present invention it has been found that unexpected and unpredictable advantages in economy and performance are obtained by a novel modification of the printing paste composition.

The present invention provides a printing paste of novel composition that achieves a striking increase in the colour yield in a transfer printing process operated under given conditions of temperature, pressure and time. Correspondingly, the invention achieves a given colour yield at lower temperatures and shorter times as compared with the prior art.

The printing pastes of the present invention enable greatly superior results to be obtained without any modification whatsoever of existing heat-transfer machinery.

In one aspect the invention provides a printing paste comprising a sublimable dye, suitably a disperse dye, a thickener and water, characterized by inclusion of an additive as hereinafter defined.

The additive is chosen from the following group and may constitute for example up to 10% of the paste:

Group 1

A. Compounds derived from the 8 - carbon radical 2-ethylhexyl of the formula $CH_3(CH_2)_3CH(C_2H_5)CH_2-$ B. Products obtained by saponification of a fatty oil and combination of resultant soap with o-, m-, and p-hydroxytoluene and orthohydroxy diphenyl, followed by addition of propylene glycol.

C. 4,6-di-tert-butyl-3-methylphenol: $(C_4H_9)_2CH_3C_6H_2OH$
2,6-di-tert-butyl-4-methylphenol $(C_4H_9)_2CH_3C_6H_2OH$ D. Phenylmethylacetate $C_6H_5CH_2COOCH_3$ (by esterification of benzyl alcohol with acetic anhydride).

E. Dibutyl glycerol ethers.

F. Eucalyptus oil.

G. Dibutyl phthalate: $C_6H_4(COOC_4H_9)_2$

H. Anionic sodium salts of an aromatic sulphonic acid (by n-butyl alcohol with phthalic anhydride).

I. Sodium salts of an aromatic sulphonic acid.

Category A above includes without being limited to:

a. 2-ethylhexyl alcohol (octyl alcohol, 2-3thyl hexanol, iso-octanol) which is essentially a mixture of closely related primary aliphatic alcohols in which dimethylhexanols and methylheptanols predominate. Its chemical and physical behaviour is typically that of a highly purified octyl alcohol. $CH_3(CH_2)_3CHC_2H_5CH_2OH$ b. 2-ethylhexyl acetate (octyl acetate) of the formula: $CH_3COOCH_2CHC_2H_5C_4H_9$ c. Capryl acetate: $CH_3COOCH_3COOC_8H_{17}$ Any of the following Group 2 may be used as emulsifiers, and may constitute for example up to 2% of the paste:

Group 2

A. Fatty alcohol polyglycol ethers, and such ethers further etherified.

B. Compounds containing bicarboxy-lower alkyl groups (as salts) such as alkylene oxide condensation products containing anionic groups or non-ionic aliphatic polyglycol ethers.

C. Soluble soaps.

D. Anionic soap products containing solvents.

E. Sulphonated oils.

F. Products obtained by the sulphonation of fatty acids esterified with polyvalent alcohols.

G. Products obtained by the esterification of alcohols with fatty acids.

H. Fatty acid derivatives bearing sulpho groups.

I. Alkylene oxide adducts.

J. Sulphonated derivatives of fatty acids.

K. Products based on sulphonates and heterocyclic bases.

L. Nitrogenous condensation products.

M. Anionic sodium alkyl sulphates.

N. Anionic alkylaryl sulphonates.

O. Anionic ammonium alkyl sulphates.

P. Products based on a fatty acid ester.

Q. Sulphated fatty acid derivatives.

R. Phosphoric acid esters.

Any of the ingredient in Group (1) can be emulsified with those of Group (2) to be used in transfer printing pastes together with a thickener and disperse dyes in accordance with the present invention.

Any disperse dye having a sublimation point between 100° and 300° C may be used in the compositions of the present invention.

The quantity of disperse dye employed is determined by the required depth of shade.

Preferred compositions of the present invention employ water-soluble colloids as thickeners. As examples of these there may be mentioned cellulose acetate, and sodium alginates such as MANUTEX RS. Other suitable thickeners are INDALCA and Guaranates, and Meyprogums.

These compositions also exhibit superior flow properties which facilitate printing of the substrate. Sodium alginates, for example exhibit thixotropic properties, that is to say their flow characteristics depend upon the applied shear stress, and compositions containing these thickeners have superior flow properties under shear. It is an incidental advantage of the present invention that the improved printing pastes in accordance therewith may contain a higher proportion of solids than was previously thought practicable.

Transfer printing on synthetic textiles is mainly applied to four types of man-made fibres, viz. polyester, polyacrylic, polyamide and triacetate. The compositions of the present invention are suitable for all four types, particularly excellent results being obtained on polyester.

To perform the transfer printing process on to the desired fabric conventional transfer presses or rotary calenders are used.

The fabric used can be either greige, bleached or dyed prior to transfer printing. If the fabric requires heatsetting this is performed prior to transfer printing.

Typical transfer conditions for different fibers quoted here by way of example only, are:

| Polyester | 20–30 | seconds at 200–210° C |
| Polyacrylic | 15–25 | seconds at 195–210° C |
| Polyamide | 15–30 | seconds at 200–210° C |
| Triacetate | 20–30 | seconds at 185–210° C |

The outstanding results obtained with a particular printing paste according to the invention are illustrated in the following Example 1.

EXAMPLE 1

A printing paste designated PRINTON NAVY BLUE 2R was prepared according to the following formulation:

| | | |
|---|---|---|
| 50 gm. | dyestuff concentrate containing | |
| | (C.I. Disperse Blue 19 | 13 parts |
| | (C.I. Disperse Violet | 7 parts |
| 100 gm. | 2 ethylhexyl alcohol | |
| 20 gm. | SANOZIL NN (alkylene oxide condensation product containing anionic groups) | |
| Balance, water to make 1000g printing paste. | | |

A transfer paper as printed on a STORK Rotary Screen machine Model RD111. The fabrics illustrated were transfer printed under the following conditions:

| | Degrees Centigrade | Time |
|---|---|---|
| Polyester | 210 ° | 30 Sec. |
| Polyacrylonitrile | 205 ° | 25 Sec. |
| Polyamide | 205 ° | 25 Sec. |
| Triacetate (ensure no 'S Finish') | 210 ° | 30 Sec. |

The printed fabrics were tested for fastness in accordance with the Recommendations of the International Organisation for Standardisation (ISO) or the tests of the American Associated of Textile Chemists and Colourists (AATCC). Prints in 1/1 standard depth were tested for wash fastness and for light fastness additional prints in 1/6 and 1/1 standard depth.

The results are shown in the following Table 1

The ratings signify, reading downwards:

| | |
|---|---|
| Triacetate | Change of shade |
| | Staining of same fabric |
| | Staining of viscose |
| Polyester, Acrylic and Polyamide Fibres | Change of shade |
| | Staining of same fabric |
| | Staining of wool |
| | Staining of cotton |
| | Washing, ° C (104° F), ISO 1. |
| | 5g/l Soap, 30 min, liquor ratio 50:1 |
| | Alkaline Perspiration ISO |
| | 5g/l Common salt |
| | 5g/l Disodium phosphate cryst. |
| | 0.5g/l Histidine Monochlorhydrate |
| | Adjusted to pH 8 with caustic soda |
| | 4 hr at 37° C (99° F) |
| | Acid Perspiration ISO |
| | 5g/l Common salt |
| | 5g/l Monosodium phosphate cryst. |
| | 0.5g/l Histidine monochlorhydrate |
| | Adjusted to pH 5,5 with caustic soda |
| | 4 hr at 37° C (99° F) |
| | Water ISO |
| | 16 hr at 20° C (68° F) |
| | Dry Cleaning ISO |
| | Perchlorethylene, 30 min at 30° C (86° F) |
| | Dry and Wet Rubbing ISO (Crockmeter AATCC) |
| | Assessed on the staining of undyed cotton fabric. |

| | |
|---|---|
| | 20 g Manutex RS |
| | 840 g water |
| | 1000 g printing paste |
| Example 5 | 50 g C.I. Disperse Red 60 |
| | 100 g phenylmethylacetate |
| | 20 g Ekaline F |
| | 40 g Meyprogum NP |
| | 790 g water |
| | 1000 g printing paste |
| Example 6 | 50 g C.I. Disperse Orange 20 |
| | 75 g Lysol |
| | 30 g Manutex RS |
| | 845 g water |
| | 1000 g printing paste |
| Example 7 | 30 g C.I. Disperse Blue 19 |
| | 20 g C.I. Disperse Yellow 54 |
| | 80 g dibutylphtalate |
| | 20 g soap |
| | 30 g Meyprogum NP |
| | 820 g water |
| Example 8 | 20 g C.I. Disperse Red 60 |
| | 30 g C.I. Disperse Red 11 |
| | 100 g 2-ethylhexanol |
| | 20 g sulphonated oil |
| | 25 g Manutex RS |
| | 805 g water |
| | 1000 g printing paste |
| Example 9 | 10 g C.I. Disperse Violet 1 |
| | 20 g C.I. Disperse Orange 20 |
| | 20 g C.I. Disperse Blue 19 |
| | 100 g 2-ethylhexanol |
| | 20 g NILO FL (anionic sodium alkyl sulphate) |
| | 20 g Manutex RS |
| | 810 g water |

Table 1

| | Fastness tests of "Printon" Navy 2R | | | | | | | |
|---|---|---|---|---|---|---|---|---|
| | Xeno 100 hrs. | Water 16 hrs. | Wash 40° C | Alcalic Perspiration | Acid Perspiration | Dry Cleaning | Crock dry | Wet |
| Polyester | | 4 | 4 | 4 | 4 | | | |
| | 4–5 | 5 | 5 | 5 | 5 | | | |
| | 3 | 5 | 5 | 5 | 5 | 5 | 5 | 5 |
| | | 5 | 5 | 5 | 5 | | | |
| Polyamide 66 | 3–4 | 5 | 5 | 5 | 5 | | | |
| | 3 | 3 | 5 | 3 | 3–4 | 5 | 4 | 4–5 |
| | | 5 | 5 | 5 | 5 | | | |
| | | 5 | 5 | 5 | 5 | | | |
| Triacetate | 4–5 | 5 | 5 | 5 | 5 | | | |
| | 3–4 | 5 | 5 | 5 | 5 | 4 | 4–5 | 5 |
| | | 5 | 5 | 5 | 5 | | | |
| Polyacrylic | 4–5 | 5 | 5 | 5 | 5 | | | |
| | 4–5 | 5 | 5 | 5 | 5 | 5 | 4–5 | 4–5 |
| | | 5 | 5 | 5 | 5 | | | |
| | | 5 | 5 | 5 | 5 | | | |

The following examples illustrate further formulations of printing pastes according to the invention, it being clearly understood that the invention is in no way limited to the specific proportions and ingredients disclosed therein.

| | |
|---|---|
| Example 2 | 60 g C.I. Disperse Blue 56 |
| | 100 g 2-ethyl hexanol |
| | 20 g Ekaline F (non-ionic aliphatic polyglcol ether) |
| | 20 g Manutex RS |
| | 800 g water |
| | 1000 g printing paste |
| Example 3 | 60 g C. I. Disperse Yellow 49 |
| | 70 g Antimussol WL (dibutyl glycerol ether) |
| | 20 g Soap |
| | 20 g Manutex RS |
| | 830 g water |
| | 1000 g printing paste |
| Example 4 | 40 g C.I. Disperse Blue 58 |
| | 70 g Antimussol WL (dibutyl glycerol ether) |
| | 30 g Ekaline F (nonionic aliphatic polyglycol ether) |

| | |
|---|---|
| | 1000 g printing paste |
| Example 10 | 40 g C.I. Disperse Blue 58 |
| | 10 g C.I. Disperse Blue 56 |
| | 60 g Antimussol WL |
| | 20 g Sanozil NN |
| | 20 g Indalca P.A.I. |
| | 850 g water |
| | 1000 g printing paste |
| Example 11 | 21 g C. I. Disperse Violet 1 |
| | 39 g C.I. Disperse Blue 19 |
| | 80 g phenylmethylacetate |
| | 20 g Sanozil NN |
| | 25 g Meyprogum NP |
| | 815 g water |
| | 1000 g printing paste |
| Example 12 | 30 g C.I. Disperse Blue 19 |
| | 30 g C.I. Disperse Red 60 |
| | 100 g 2-ethylhexanol |
| | 20 g Sanozil NN |
| | 20 g Manutes RS |
| | 800 g water |
| | 1000 g printing paste |
| Example 13 | 20 g C.I. Disperse Yellow 54 |
| | 18 g C.I. Disperse Blue 58 |
| | 2 g C.I. Disperse Blue 56 |
| | 70 g dibutylphtalate |

-continued

|  |  |
|---|---|
|  | 30 g Sandozin NI (nonionic alkylene oxide product) |
|  | 20 g Manutex RS |
|  | 840 g water |
|  | 1000 g printing paste |
| Example 14 | 60 g C.I. Disperse Blue 19 |
|  | 14 g C.I. Disperse Orange 20 |
|  | 3 g C.I. Disperse Yellow 23 |
|  | 60 g phenylmethylacetate |
|  | 20 g sulphonated oil |
|  | 20 g Manutex RS |
|  | 823 g water |
|  | 1000 g printing paste |
| Example 15 | 40 g C.I. Disperse Blue 19 |
|  | 20 g C.I. Disperse Violet 1 |
|  | 5 g C.I. Disperse Orange 20 |
|  | 80 g dibutylphtalate |
|  | 20 g Sanozil NN |
|  | 20 g Manutex RS |
|  | 815 g water |
|  | 1000 g printing paste |
| Example 16 | 30 g C.I. Disperse Yellow 54 |
|  | 60 g C.I. Disperse Red 60 |
|  | 80 g 2-ethylhexylacetate |
|  | 20 g Sanozil NN (alkylene oxide condensation product containing anionic groups) |
|  | 25 g Indalca P.A.I. |
|  | 785 g water |
|  | 1000 g printing paste |
| Example 17 | 60 g C.I. Disperse Blue 19 |
|  | 80 g Capryl acetate |
|  | 30 g Sanozil NN |
|  | 25 g Manutex RX |
|  | 805 g Water |
|  | 1000 g printing paste |
| Example 18 | 30 g C.I. Disperse Yellow 23 |
|  | 100 g 2-ethylhexanol |
|  | 25 g soap |
|  | 20 g Manutex RS |
|  | 825 g water |
|  | 1000 g printing paste |
| Example 19 | 40 g C.I. Disperse Red 11 |
|  | 80 g Dibutyl phtalate |
|  | 20 g sulphonated oil |
|  | 20 g Indalca P.A.I. |
|  | 840 g water |
|  | 1000 g printing paste |
| Example 20 | 40 g C.I. Disperse Red 60 |
|  | 40 g C.I. Disperse Orange 20 |
|  | 100 g 2-ethylhexanol |
|  | 20 g Nilo VO (nonionic alkylene oxide adduct) |
|  | 25 g Manutex RS |
|  | 775 g water |
|  | 1000 g printing paste |
| Example 21 | 40 g C.I. Disperse Yellow 54 |
|  | 60 g Eucalyptus oil |
|  | 25 g NILO FL (anionic sodium alkyl sulphate) |
|  | 25 g manutex RS |
|  | 850 g water |
|  | 1000 g printing paste |

While the present invention is in no way restricted to any postulated chemical mechanism for the observed superior effects, it is thought possible that the additive acts in some way as a sublimation catalyst, thereby promoting more rapid and more complete transfer of dye at the temperature of the printing process.

In dyeing synthetic fibres the required amount of disperse dye is mixed with water and the concentrated dispersion is then added to the dyebath through a fine sieve to prevent any particles or aggregates of dyes entering the dye liquor. A dispersing agent is almost always added to promote levelling and to prevent surface deposition of dye which causes poor fastness to rubbing and specking. This is caused by fine particles of dye clinging to the surface of the dyed material. They cannot be detected initially but after the textile has been stored for some time, they dissolve in the material producing coloured specks which are very conspicuous on pale shades.

The oil-soluble dye dissolves in the spherical micelles of paraffin-chain salts. The idea of solution of hydrophobic dye molecules in micelles is now generally accepted, and, in support of this, little solubilisation occurs below the concentration required for micelle formation. The solutions obtained as a result solubilisation are clear and stable and look like true solutions.

In a preferred embodiment of this invention, a marked solubilisation has been obtained using an aliphatic alcohol having 1 to 14 carbon atoms, preferably 8 to 14 carbon atoms, for example 2-ethylhexyl alcohol (2-ethylhexanol or octyl alcohol) $CH_3(CH_2)_3CHC_2H_5CH_2OH$ It has been observed that the solids content in our sublimation transfer printing paste is less critical than before, in other words, the vapour form of the disperse dye is much less hindered on its path through the thickened printing paste on to the fabric where it finally condenses back to its solid form.

Apart from the inclusion of the novel additives, the printing paste formulations are conventional and consequently, textile printers can adapt to their use without any inconvenient change in procedure. It will be clearly understood that variation of the actual proportions of the ingredients of the paste to meet particularly requirements and to adjust for the specific properties of various dyes may be readily determined by simple experiment within the competence of persons skilled in the art and the scope of the invention embraces all printing pastes having the unpredictably superior properties imparted by addition of the abovementioned additive.

I claim:

1. A sublimation printing paste for application to a substrate comprising a sublimable disperse dye, a thickener and water characterized by inclusion therein of an additive in an amount sufficient to improve the flow properties of said printing paste, said additive selected from the group consisting of 2-ethylhexyl alcohol, 2-ethylhexyl acetate, capryl acetate, phenyl methylacetate, eucalyptus oil, and emulsified ortho, meta, and para hydroxytoluene, so that said sublimable disperse dye may be transferred from said substrate to a textile fabric at a temperature at which said sublimable disperse dye sublimes.

2. The printing paste of claim 1 including an emulsifier.

3. The printing paste of claim 1 including at least about 6% of said additive.

4. The printing paste of claim 2 wherein said emulsifier is selected from the group consisting of fatty alcohol polyglycol ethers, nonionic alkylene oxide condensation products, anionic alkylene oxide condensation products, sulphonated oils, products of the sulphonation of fatty acids esterified with polyvalent alcohols, products of the esterification of alcohols with fatty acids, anionic sodium alkyl sulphates, and anionic alkylaryl sulphonates.

5. The printing paste of claim 1 wherein said thickener comprises a water-soluble colloid.

6. The printing paste of claim 5 wherein said water-soluble colloid is selected from the group consisting of an alginate.

7. The printing paste of claim 1 wherein said sublimable disperse dye has a sublimation point between about 100° and 300° C.

8. The printing paste of claim 1 wherein the amount of said additive is not more than 10% by weight of said printing paste.

9. The printing paste of claim 2 wherein the amount of said emulsifier is not more than 2% by weight of said printing paste.

* * * * *